United States Patent [19]
Dendy et al.

[11] 3,967,159
[45] June 29, 1976

[54] POWER SUPPLY FOR A LASER OR GAS DISCHARGE LAMP

[75] Inventors: King Hubert Dendy, Panorama City; Morton B. Leskin, Sherman Oaks, both of Calif.

[73] Assignee: Morton B. Leskin, Sherman Oaks, Calif.

[22] Filed: Feb. 3, 1975

[21] Appl. No.: 546,331

[52] U.S. Cl. .............. 315/247; 315/279; 315/308; 321/14; 321/15; 321/19; 323/20; 323/22 T; 323/22 Z; 331/113 R; 331/177 R; 331/183
[51] Int. Cl.² ............ G05F 1/44; H05B 41/29
[58] Field of Search .......... 315/247, 276, 279, 307, 315/308; 331/113 R, 177 R, 183; 321/14, 15, 18, 19; 323/7, 20, 22 T, 22 Z

[56] References Cited
UNITED STATES PATENTS

| | | | |
|---|---|---|---|
| 3,462,643 | 8/1969 | Turner et al. | 315/307 X |
| 3,551,785 | 12/1970 | Ferrara | 315/307 X |
| 3,689,827 | 9/1972 | Quinn | 315/276 X |
| 3,701,937 | 10/1972 | Combs | 321/14 X |

*Primary Examiner*—Siegfried H. Grimm
*Attorney, Agent, or Firm*—Howard A. Silber

[57] ABSTRACT

A regulated power supply for a laser or gas discharge lamp employs a variable duty cycle oscillator to control the output voltage level. Output current to the laser or lamp load is maintained at a constant value by a feedback loop that controls the oscillator duty cycle. The output current is sensed by a novel circuit which employs a voltage regulator in series with the current return path. A change in output current causes a concomitant change in voltage across a resistor divider that shunts the voltage regulator. The voltage from this divider is a feedback signal that is supplied to a duty cycle modulator which controls the oscillator duty cycle.

Another feedback signal is derived in delayed response to voltage output in excess of a certain high value. This feedback signal, which occurs, e.g., when the laser or lamp load does not ignite within a certain time period, also modifies the oscillator duty cycle so as to reduce the output voltage to a level that can be maintained continuously without damage or overheating of any circuit component.

19 Claims, 1 Drawing Figure

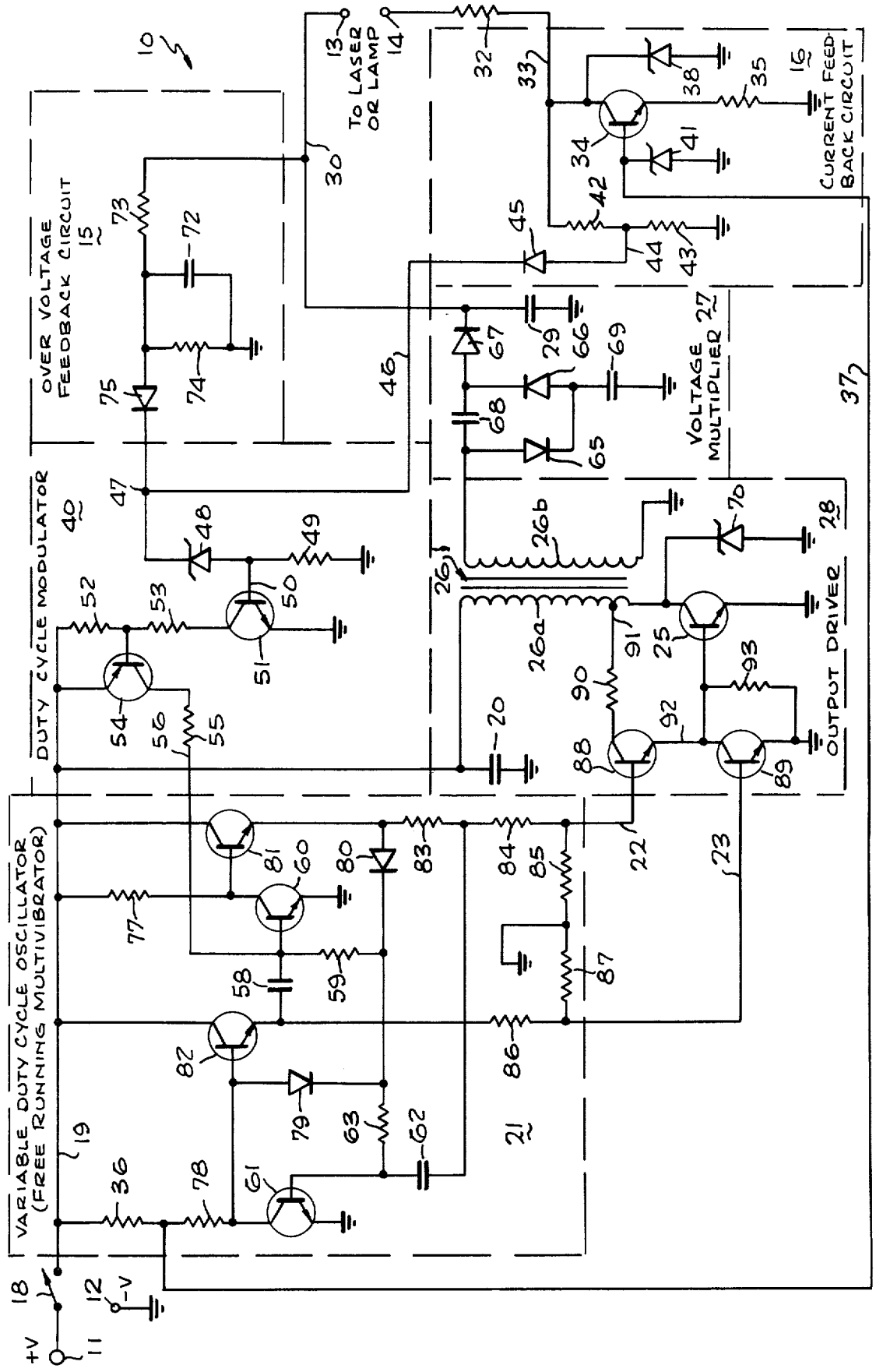

POWER SUPPLY FOR A LASER OR GAS DISCHARGE LAMP

BACKGROUND OF THE INVENTION

1. Field of the Invention

The present invention relates to a regulated power supply for a laser or gas discharge lamp.

2. Description of the Prior Art

Gas lasers, such as those using mixtures of helium and neon, have certain operational characteristics that impose stringent power requirements. To turn on the laser, a relatively high voltage (typically on the order of 8kv to 10kv) must be applied across the anode and cathode. As the laser begins to ignite, the voltage across the laser decreases as the current increases. That is, the laser goes through a "negative resistance" range in which oscillation or self shut-off of the laser can occur. As more current is drawn, a positive resistance region is reached in which the voltage increases with increasing current. Stable performance requires operation in this region.

During operation changes may occur in laser performance, such as variation in the gas excitation level with concomitant change in light output. To maintain a constant light level from the ignited laser requires dynamic control of the power supplied to the laser. For example, if the light level should drop, with a corresponding decrease in current drawn by the laser, it is advantageous to increase the supplied voltage so as to bring the current level and hence the light output back up to the desired value.

To meet these requirements, the power supply initially must be able to supply a voltage great enough to cause lamp ignition. To accomplish this in the past, power supplies have been configured to provide the necessary high voltage output. A problem occurred if for some reason the laser did not ignite, or the supply accidently was turned on without the laser being connected. In this instance, the power supply continued to put out the high excitation voltage which was in excess of the continuous operating characteristics of the power supply. As a result, overheating occurred and components broke down. In contrast, it is an object of the present invention to provide a power supply for a laser in which the output voltage level automatically is decreased if the laser or other load does not ignite within a preset time duration. The power supply can operate continuously at the reduced output voltage level without overheating or other damage to circuit component.

Another difficulty with prior art power supplies concerned the prevention of operation in the negative resistance region. One approach was to use a large ballast resistor. But this had the disadvantage of dissipating excessive energy once the lamp was ignited. Thus another object of the present invention is to provide a power supply which insures operation in the positive resistance region.

Feedback circuits are known for maintaining a constant current output to the laser once it has been ignited, so as to maintain constant light output. However, the current sensing circuits in such feedback loops could not tolerate a large voltage swing, thereby limiting their operational effectiveness. A further object of the present invention is to provide a current sensing circuit which can tolerate a large voltage swing and which exhibits high dynamic impedance. Still another object is to provide a feedback loop in which the output current is sensed by a series voltage regulator.

SUMMARY OF THE INVENTION

These and other objectives are achieved in a power supply that uses a variable duty cycle oscillator to control the output voltage. When the power supply first is turned on, the oscillator runs at maximum duty cycle. This provides an output voltage sufficiently great so as to ignite a laser or other gaseous discharge lamp such as a xenon short arc lamp.

In the event that the laser or lamp does not ignite within a given period of time (typically 1 sec to 2 sec), or if no load is connected to the power supply, an overvoltage feedback circuit provides a first feedback signal to a duty cycle modulator. This modulator in turn reduces the duty cycle of the oscillator so as to decrease the output voltage. The output voltage stabilizes at a level sufficiently low so that continuous operation can be maintained without overheating or damage to any circuit components.

When the laser or gas discharge lamp ignites, current is drawn from the power supply. The current level is sensed by a circuit which includes a voltage regulator in series with the current return path. The voltage regulator is shunted by a resistor divider. With this arrangement, a small change in current causes a relatively large change in voltage across the divider. The voltage at the divider tap is used as a second control signal that also is supplied to the duty cycle modulator.

With this arrangement, a change in output current causes a concomitant change in the oscillator duty cycle. If the current decreases, the duty cycle is increased so that the voltage output is increased. As a result, the current is restored to the desired value. That value is established by a fixed bias supplied to the voltage regulator and by the value of a resistor included in the regulator circuit. Constant current and hence constant light output and stable operation of the laser or lamp are obtained.

BRIEF DESCRIPTION OF THE DRAWINGS

A detailed description of the invention will be made with reference to the accompanying drawings wherein the single FIGURE is an electrical schematic diagram of a preferred embodiment of the inventive power supply.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention best is defined by the appended claims.

The inventive power supply 10 is powered by a low voltage dc source, typically a 12 volt battery, connected to the input voltage terminals 11, 12. The supply 10 provides a high voltage, typically 1.8kv output to a laser or lamp (not shown) via output terminals 13, 14. In accordance with the present invention, the output voltage initially present across the terminals 13, 14 is sufficient (typically 8kv to 10kv) to turn on the associated laser or gas discharge lamp. In the event that the laser or lamp does not start, an overvoltage feedback circuit 15 causes the output voltage to decrease after some period of time (typically 2 sec) to a lower level that can be supplied to an open circuit output continuously without overheating or other damage to any of the power supply 10 components. Once the laser or lamp has started, the output current is stabilized at a predetermined value (typically 6ma) by means of a current feedback circuit 16. Substantially constant current output is maintained by the supply 10 despite substantial changes in the voltage drawn by the ignited laser or lamp load.

The power supply 10 is turned on by closing a switch 18 to connect the dc source voltage to a common positive buss 19. The dc voltage is filtered by a capacitor 20. A variable duty cycle oscillator 21, herein a free-running multivibrator, provides complementary rectangular-wave output signals on a pair of lines 22, 23. These signals alternately turn on and off a transistor 25, thereby intermittently connecting the dc source voltage across the input winding 26a of an output step-up transformer 26. The duty cycle at which the voltage is applied to the transformer 26 thus is established by the oscillator 21.

The output voltage from the secondary 26b of the transformer 26 is supplied to a voltage multiplier 27. This circuit 27 multiplies the voltage from the output driver circuit 28 by about two and one-half times, to provide across an output capacitor 29 the desired high voltage. This voltage is supplied via a line 30 to the positive output terminal 13.

The current return path from the associated lamp or laser includes the terminal 14, a ballast resistor 32, a line 33, a transistor 34 and a resistor 35 to ground (i.e., to the common dc return). The transistor 34 normally is biased on by a positive voltage supplied from the line 19 via a resistor 36 and a line 37. A zener diode 38, shunted across the transistor 34 and the resistor 35, prevents breakdown of the transistor 34 should the voltage between the line 33 and ground exceed the voltage rating of that transistor. For example, the transistor 34 may comprise a type D40N3 having a forward voltage rating on the order of 300 volts maximum. In this instance, the zener diode 38 may have a rating on the order of 270 volts, so that the voltage across the transistor 34 always is limited to a value at which the transistor will not break down.

When the associated laser or lamp is on and emitting light, the output current from the power supply 10 automatically is maintained at a preset value. This is accomplished by the current feedback circuit 16 and a duty cycle modulator 40 which cooperate to change the duty cycle of the oscillator 21 in such a manner as to maintain constant output current.

The current feedback circuit 16 utilizes a voltage regulator to sense a change in current. This unique circuit provides an output voltage which changes considerably in response to the amount of current drawn by the laser or lamp load. To this end, the transistor 34, the resistor 35 and a zener diode 41 together form a voltage regulator circuit. The zener diode 41, connected from the base of the transistor 34 to ground, maintains that base at a potential equal to the zener breakdown voltage (typically 7v to 8v). As a result, the voltage at the emitter of the transistor 34 is fixed at a level slightly more negative than the base, i.e., slightly more negative than the breakdown voltage of the zener diode 41. Since the emitter voltage is fixed, the current through the resistor 35 necessarily is fixed. For example, if the transistor 34 emitter voltage is 7.2 volts and the resistor 35 is 1200 ohms, the current which flows in the path from the line 33 through the transistor 34 and the resistor 35 is fixed at 6 milliamperes.

The transistor 34 and the resistor 35 are shunted by a pair of series connected resistors 42, 43. Advantageously the total resistance of these two resistors is considerably higher than the resistance through the path including the transistor 34 and the resistor 35.

Output current from the power supply 10 flows through both of the parallel paths including the first path through the transistor 34 and resistor 35 and the second path through the resistors 42 and 43. If the output current should exceed the limiting value through the resistor 35, more current will flow through the resistors 42 and 43. That is, the voltage on the line 33 will increase with respect to ground. Due to the voltage regulating action of the transistor 34 and the zener diode 41, the regulator output voltage at the emitter of the transistor 34 will remain constant at the fixed value (7.2 volts in the example). However, the voltage on the line 33 at the input to the regulator will increase. The voltage across the resistors 42, 43 likewise increases. These resistors 42, 43 act as a voltage divider so that the voltage at their junction 44 also will increase. The voltage at the junction 44 thus is indicative of the amount of current drawn by the power supply 10 load. The voltage on the line 44 is supplied via a diode 45 and a line 46 as a feedback control voltage to the input point 47 of the duty cycle modulator 40.

In the duty cycle modulator 40 a voltage reference is established by a zener diode 48 and a resistor 49 connected between the point 47 and ground. When a voltage change occurs on the line 46 as a result of a current variation to the laser or lamp load, the voltage at the interconnection 50 between the zener diode 48 and the resistor 49 will change concomitantly. This in turn causes a change in the duty cycle of the oscillator 21 in a direction so as to compensate for the output current variation.

To accomplish this duty cycle modulation, the voltage on the line 50 is supplied to the base of a transistor 51 that controls the voltage drop across a resistor divider consisting of the resistors 52 and 53. The voltage at the junction of these resistors 52, 53 in turn is supplied to the base of a PNP transistor 54 so as to control the conduction therethrough. The transistor 54 is connected in series between the positive dc buss 19 and a resistor 55. As a result, a duty cycle control voltage is provided on a line 56 from the resistor 55 that is proportional to the feedback signal supplied on the line 46 from the current feedback circuit 16.

This signal on the line 56 is supplied to the junction between a capacitor 58 and a resistor 59 in the oscillator 21. These two components establish the on-time of one of the switching transistors 60, 61 in the multivibrator 21 circuit. The on-time of the other switching transistor is established by a capacitor 62 and a resistor 63. By changing the voltage on the line 56, these on-times are modified so as to change the oscillator duty cycle. An increase in the feedback signal level at the point 46 causes an increase in voltage level on the line 56 and results in decreasing the duty cycle of the oscillator 21.

By way of example, if the current drawn by the associated laser or lamp should increase for some reason, the transistor 34, the resistor 35 and the zener diode 41 operate as a clamped series regulator to sense the change of current. As a result, a substantial voltage change in the positive direction will occur on the line 33, with a concomitant voltage increase across the divider resistors 42, 43. The feedback signal on the line 46 will increase, the transistors 51 and 54 will conduct more heavily and a larger voltage will appear on the line 56. This will change the oscillator 21 duty cycle in a direction so as to decrease the on-time duty cycle of the voltage applied to the transformer 26. The output voltage on the line 30 will decrease concomitantly, with a result that the laser or lamp load will draw less current, thereby compensating for the sensed increase in current. Conversely, a decrease in current drawn by the laser or lamp will reduce the feedback voltage on the line 46 and increase the duty cycle of the oscillator 21. This will increase the voltage to the load, and hence bring the output current up to the desired level.

To turn on the associated laser or lamp normally requires the initial application of a voltage substantially higher than that required to keep the laser or lamp lit. Such an initial high voltage is provided by the supply 10.

When the switch 18 first is closed, there will be no feedback signal at the point 47. As a result, the oscillator 21 will operate with maximum duty cycle. Thus the voltage output from the transformer 26 will be a maximum. Typically the voltage developed across the output winding 26b will be in the order of 4kv. The voltage multiplier 27, consisting of three diodes 65, 66, 67 and a pair of capacitors 68, 69, multiply this output voltage by about two and a half times. Thus the output voltage initially developed across the capacitor 29 typically is on the order of 10kv. This voltage is sufficient to ignite a laser or gas discharge lamp.

The maximum output voltage developed across the capacitor 29 is limited by a zener diode 70 that is connected in shunt with the output transformer switching transistor 25. The zener breakdown voltage of this diode 70 preferably has a value just below the breakdown voltage of the transistor 25. Thus when the output voltage, transformed back from the output winding 26b to the transformer primary winding 26a, exceeds the breakdown voltage of the zener diode 70, that diode conducts. The result is both that the output voltage is limited and that breakdown of the transistor 25 due to excessive voltage is prevented.

In the event that the laser or lamp load does not ignite, or in the event that the supply 10 is turned on when not connected to a load, the overvoltage feedback circuit 15 will function to reduce the output voltage to a level which can be provided continuously without damage or overheating of any components. To this end, the feedback circuit 15 includes a capacitor 72 that is charged via a resistor 73 by the voltage on the output line 30. As the charge on the capacitor 72 increases, a concomitant feedback voltage is developed across a resistor 74. This feedback voltage is supplied via a diode 75 to the input point 47 of the duty cycle modulator 40. As the signal voltage increases, the duty cycle of the oscillator 21 is decreased so as to decrease the output voltage from the supply 10.

The resistor 73 and the capacitor 72 advantageously are selected to have a time constant sufficiently long to allow a typical laser or gas discharge lamp to ignite. Typically this RC time constant is on the order of 1 sec to 2 sec. Thus when the power supply 10 initially is turned on, the output voltage will rise toward its maximum level (typically 10kv). If the associated laser or lamp load does not ignite within one or two seconds, i.e., within the time period established by the capacitor 72 and the resistor 73, the control signal developed at the point 47 by the overvoltage feedback circuit 15 will cause the output voltage from the supply 10 to drop to a substantially lower level, typically on the order of 6kv. Since the laser or lamp has not excited, no current is drawn and hence no feedback signal is developed by the current feedback circuit 16. The overvoltage feedback signal developed by the circuit 15 will continue to maintain the power supply output at a level sufficiently low so as to prevent component breakdown or overheating.

Once the laser or lamp ignites and starts to draw current, a feedback signal will be developed on the line 46 by the current feedback circuit 16. This will now reduce the oscillator 21 duty cycle (as described above) so as to reduce the output voltage and to maintain the current at a constant level. At the reduced output voltage level, the output signal from the overvoltage feedback circuit 15, as developed across the resistor 74 operating with the resistor 73 as a voltage divider, is sufficiently low so that only the control signal from the current feedback circuit 16 is effective to modulate the oscillator 21 duty cycle.

Except as described above in conjunction with the duty cycle modulation, the oscillator 21 is a conventional free-running multivibrator. The switching transistors 60, 61 in that circuit each are connected to the positive dc buss 19 by a respective resistor 77, 78. The cross-connections between the transistors 60, 61 include a pair of diodes 79, 80 in addition to the RC components 58, 59, 62, 63. An additional pair of transistors 81, 82 function as emitter followers for the respective transistors 60, 61. The oscillator 21 output signals are obtained from the emitters of these followers 81, 82 via a set of resistors 83–87.

As noted above, the output is an asymmetrical rectangular wave having a duty cycle established by the modulator 40. Complementary output signals are obtained on the lines 22 and 23. These signals are used alternatively to turn on a pair of transistors 88, 89 that are connected in series with a small (typically 3.9 ohm) resistor 90 between a tap 91 on the output transformer winding 26a and ground. The common connection 92 between the transistors 88 and 89 is connected to the base of the switching transistor 25 and to a resistor 93 that shunts the transistor 89.

With this arrangement, when the signal on the line 22 is positive, the transistor 88 conducts and applies a voltage, obtained from the tap 91, to the base of the transistor 25, thereby turning that transistor on. At the same time, the complementary signal on the line 23 is low so that the transistor 89 remains off. When the free-running multivibrator 21 flips to the other state, the line 22 is low and the line 23 is high. As a result, the transistor 88 will stop conducting, thereby removing the bias voltage from the base of the transistor 25. The transistor 89 will conduct, so as to connect the base of the transistor 25 to the negative dc voltage. This clamps the transistor 25 off. In this manner, clean turn-on and turn-off of the transistor 25 is achieved to provide effective switching of the voltage to the input winding 26a of the transformer 26. When the transistor 25 is on, energy is stored in the primary winding 26a. When the transistor 25 goes off, the stored energy is induced into the secondary winding 26b, and hence supplied via the voltage multiplier 27 to the output terminal 13.

Intending to claim all novel, useful and unobvious features shown or described, the applicants make the following:

We claim:

1. In a power supply of the type including a feedback loop to maintain the output current at a substantially constant level, the improvement for providing a first feedback signal that is indicative of the output current drawn from said supply, comprising;
    a voltage regulator connected in series with the current return path from the power supply load, and
    a resistive network across said voltage regulator, a change in output current drawn from said power supply causing a concomitant change in voltage across said resistive network, said first feedback signal being proportional to said voltage.

2. A power supply according to claim 1 wherein said resistive network comprises a resistor voltage divider, said first feedback signal being the voltage developed across a portion of said resistor divider.

3. A power supply according to claim 1 wherein said voltage regulator comprises a transistor and a resistor connected in series in said power supply load current return path, and a source of fixed voltage applied to the base of said transistor.

4. A power supply according to claim 3 wherein said source of fixed voltage includes a zener diode connected to said transistor base to establish said fixed base voltage, and wherein the value of said series connected resistor is selected to set the desired power supply output current level.

5. A power supply according to claim 1 wherein said feedback loop contains;
    a variable duty cycle oscillator connected so that the duty cycle of said oscillator controls the output voltage of said power supply, and
    a duty cycle modulator circuit for changing said oscillator duty cycle as a function of said feedback signal.

6. A power supply according to claim 5 further comprising an overvoltage feedback circuit providing a second feedback signal in delayed response to occurrence of an excessive output voltage, said second feedback signal being connected to said duty cycle modulator so as to effect reduction in the power supply output voltage.

7. A power supply according to claim 6 wherein said duty cycle modulator circuit includes a common point to which both said first and second feedback signals are connected, and a voltage comparator including a zener diode connected to said common point, the duty cycle of said oscillator being controlled in inverse proportion to the voltage at said common point as sensed by said voltage comparator.

8. A power supply according to claim 1 wherein said feedback loop includes control circuitry for changing the power supply output voltage in inverse proportion to said feedback signal voltage, said feedback loop causing said power supply output voltage to be of maximum value when said supply first is turned on, and further comprising a circuit, responsive to the power supply output voltage, for providing a second feedback signal if said output voltage remains near said maximum value for a certain time duration after said turn-on, said second feedback signal being supplied to said feedback loop to cause reduction of the power supply output voltage.

9. A power supply according to claim 8 together with a load selected from the group consisting of a laser and a gas discharge lamp, said certain time being sufficient to permit turn-on of said load, occurrence of said second feedback signal causing reduction in said power supply output voltage level if said load does not turn-on within said certain time, said feedback loop maintaining the current to said load at a constant level after said load turns on.

10. In a power supply of the type wherein an output voltage is developed across a transformer having a primary winding that is intermittently switched into connection with a source of voltage, said power supply being capable of developing an output voltage level sufficiently high to ignite a load of the type requiring a high ignition voltage and thereafter requiring a much lower operating voltage as current is drawn by the load after ignition, the improvement comprising:
    an oscillator having a variable duty cycle, said oscillator controlling the switching of said transformer primary so that said primary is connected to said voltage source for a duty cycle established by the oscillator duty cycle,
    duty cycle modulator means for modulating the duty cycle of said oscillator in response to a control voltage,
    a first feedback circuit, operative only prior to ignition of said load, for providing to said modulator means a first control voltage, which results in a decrease in duty cycle of said oscillator, in delayed response to occurrence of an output voltage from said supply that is above a certain level sufficiently high to ignite said load, said delay being of sufficient time so as to permit said load to be ignited, and
    a second feedback circuit, responsive to the output current from said power supply, for providing to said modulator means a second control voltage which causes the oscillator duty cycle to change in inverse proportion to the power supply output current, said duty cycle and hence said output voltage initially being maximum as minimal current is drawn prior to turn-on of said load.

11. A power supply according to claim 10 wherein said first feedback circuit includes a resistor and capacitor time constant network connected to the power supply output voltage terminal, said network providing said first control voltage after a delay time period established by the values of said resistor and capacitor.

12. A power supply according to claim 11 wherein said certain output voltage level is sufficient to ignite a load selected from the group consisting of a laser and a gas discharge lamp and wherein said resistor and capacitor values are selected to provide a delay time period sufficient for normal ignition of said load.

13. A power supply according to claim 10 wherein said second feedback circuit comprises;
    a voltage regulator connected in series with the power supply load current return path, and
    a resistor network connected in shunt with said voltage regulator, said second control voltage being obtained from said resistor network.

14. A power supply according to claim 13 wherein said voltage regulator comprises a transistor and a resistor connected in series in said return path, and a zener diode connected to the base of said transistor to establish a fixed bias therefor, the value of said resistor being selected to establish the output current level that is maintained by said power supply, and wherein said resistor network comprises a resistor voltage divider, said second control voltage being obtained from a tap on said divider.

15. A power supply according to claim 10 wherein said duty cycle modulator means comprises a voltage comparator utilizing a zener diode as a voltage reference, said first and second control voltages both being connected to said voltage comparator, said voltage comparator providing an output signal that is used to control the duty cycle of said oscillator.

16. A power supply according to claim 10 wherein said oscillator is a free-running multivibrator, said duty cycle modulation means being connected to control the duty cycle of said multivibrator.

17. A power supply according to claim 16 having;
a switching transistor connected in series with the primary winding of said transformer and a source of dc potential,
first and second transistors connected in series between a tap on said transformer primary winding and the return buss of said dc potential, the common connection of said first and second transistors being connected to the base of said switching transistor, and wherein
the complementary outputs from said multivibrator are connected to the respective bases of said first and second transistors, whereby when the multivibrator is in one state said first transistor and said switching transistor are on and said second transistor is off, and when said multivibrator is in the other state said first transistor and said switching transistor are off and said second transistor is on.

18. In a power supply of the type wherein a high voltage output is developed across a transformer having a primary winding that is intermittently switched into connection with a source of voltage, the improvement comprising:
an oscillator having a variable duty cycle, said oscillator controlling the switching of said transformer primary so that said primary is connected to said voltage source for a duty cycle established by the oscillator duty cycle,
duty cycle modulator means for modulating the duty cycle of said oscillator in response to a control voltage,
a first feedback circuit, for providing to said modulator means a first control voltage, which results in a decrease in duty cycle of said oscillator, in delayed response to occurrence of an output voltage from said supply that is above a certain level,
a second feedback circuit, responsive to the output current from said power supply, for providing to said modulator means a second control voltage which causes the oscillator duty cycle to change in inverse proportion to the power supply output current,
a switching transistor connected in series between said transformer primary winding and a source of dc potential, said transistor being connected to said oscillator so as to be turned on with a duty cycle corresponding to that of said oscillator, and
a zener diode connected across said switching transistor, said zener diode having a zener breakdown voltage less than the collector-to-emitter breakdown voltage of said switching transistor, said zener diode thereby preventing damage to said switching transistor and limiting the maximum output voltage from said power supply.

19. A power supply according to claim 18 together with a voltage multiplier connected between the secondary winding of said transformer and the output terminal of said power supply.

* * * * *